Oct. 20, 1931.  V. BENDIX  1,827,867
ENGINE STARTER
Filed June 25, 1923
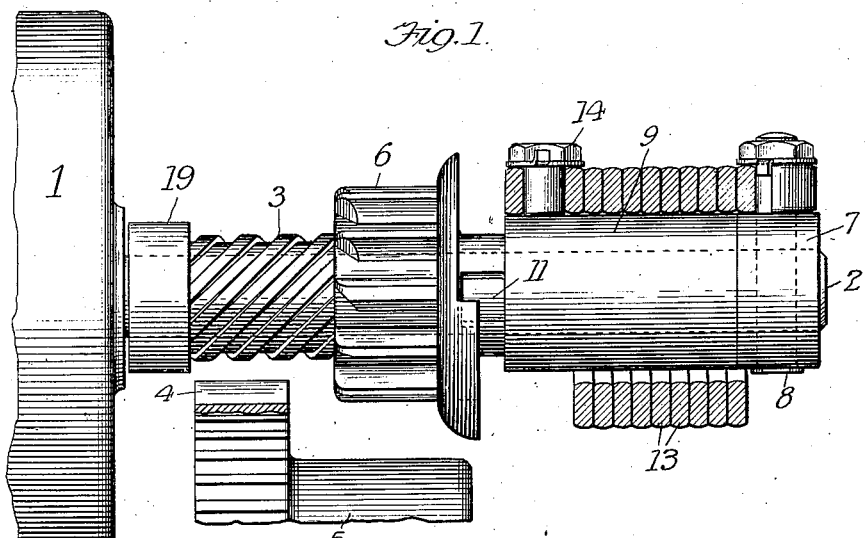
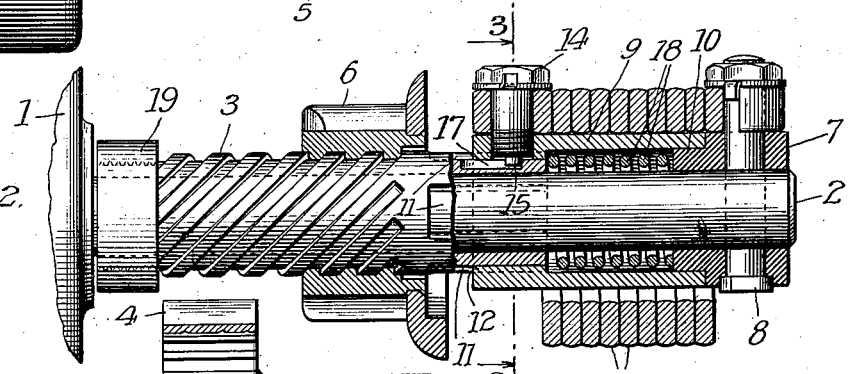
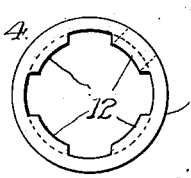
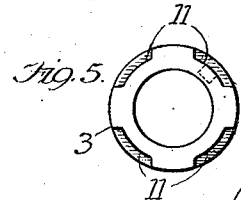
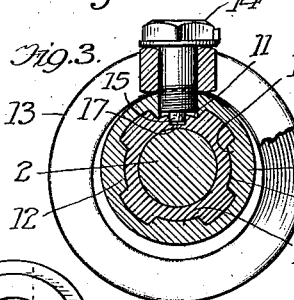
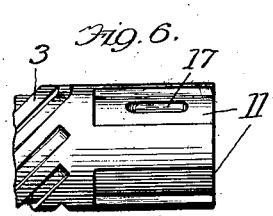

Patented Oct. 20, 1931

1,827,867

UNITED STATES PATENT OFFICE

VINCENT BENDIX, OF CHICAGO, ILLINOIS

ENGINE STARTER

Application filed June 25, 1923. Serial No. 647,492.

My invention relates to engine starters and to that part thereof known as the drive or transmission which operatively connects the prime mover such as an electric motor with a member, such as the fly-wheel, of the engine to be started. In the present instance my invention has been shown incorporated in that form of drive known as the Bendix drive and exemplified by my Patent No. 1,125,935 issued on January 26, 1915, and characterized by the provision of a screw shaft mounted on a driving shaft for rotary movement therewith and for limited longitudinal movement thereon, a driving member such as a pinion threaded on the screw shaft and adapted to engage the engine member, and a yielding driving connection such as a coiled spring interposed between the driving shaft and the screw shaft. In this construction of drive the screw shaft moves or yields longitudinally against the compression of the drive spring itself. The more particular object of my invention is to provide means independent of the drive spring for yieldingly resisting such longitudinal movement of the screw shaft and a further object of my invention is to provide novel and efficient driving connections between the driving shaft and screw shaft which in the present instance consists, in addition to the drive spring, of a driving head and a sleeve operatively connected with the screw shaft. My new construction of drive embodies other novel and advantageous features of construction and operation which will be apparent from the description hereinafter given.

In the accompanying drawings Fig. 1 is an elevation of an engine starter system including my new form of drive but showing the drive spring in section, Fig. 2 a view similar to Fig. 1 but showing certain other parts thereof in section; Fig. 3 a cross-section on the line 3—3 of Fig. 2; Fig. 4 an end view of the sleeve; Fig. 5 an end view of the screw shaft; Fig. 6 an elevation of an end portion of the screw shaft, and Fig. 7 an end view of the driving head.

My invention may partake of different forms of construction but for the purpose of a clear and definite description of such invention I have shown it embodied in a drive of the type exemplified by my patent aforesaid and I will proceed to describe the same in connection therewith without intention of limitation thereto except as may be required by specific claims. Moreover, it will be understood that while I have shown the drive as of the direct type in which the screw shaft is mounted upon an extended armature shaft it will be understood that my invention is equally applicable to the indirect or double-reduction type in which the screw shaft is mounted on a counter-shaft.

Furthermore, while I have shown my invention in connection with a drive of the inboard type in which the pinion moves inwardly towards the motor in the meshing operation it will be understood that it is also applicable to the outboard type of drive.

As shown, the electric motor 1 is provided with an extended armature shaft 2 which constitutes the driving shaft for the drive. A driven member which is here the hollow screw shaft 3 is mounted upon the driving shaft for rotary movement therewith and for a limited longitudinal movement thereof. The driving member between the screw shaft and the gear ring or teeth 4 of the engine fly-wheel 5 is in the form of a pinion 6 threaded on such screw shaft. A driving head 7 is secured to the outer end of the driving shaft 2 by means of the pin 8. A sleeve 9 encircles the outer end of the driving shaft 2 and is supported at its outer end by the reduced portion 10 of the driving head and at its inner end by the outer end of the screw shaft. As illustrated in Figs. 3, 4 and 5 the screw shaft telescopes to an extent within the sleeve 9 and is keyed thereto by reason of the longitudinal keyways 11 at the outer end of the screw shaft and the longitudinal projections or integral keys 12 formed in the bore of the sleeve. As a result the sleeve 9 is operatively connected with the screw shaft for positive rotary movement together and for the longitudinal movement of the screw shaft with respect to the sleeve which has a fixed position longitudinally.

The driving head 7 is operatively connected with the sleeve 9 by means of a yielding driving connection which is here a coiled drive spring 13 encircling the sleeve 9 and connected at its opposite ends with the head 7 through the medium of the pin 8 and with the sleeve 9 through the medium of the screw 14. This screw screws into the sleeve 9 and has at its inner end a projecting pin 15 which enters a slot or groove 17 in one of the keyways 11. By this means the longitudinal movement of the screw shaft with respect to the sleeve is limited. Yielding means are provided tending to resist such longitudinal movement of the screw shaft and such means in the present instance consists of a light coiled spring 18 which is contained within the sleeve 9 and is interposed between the driving head 7 and the outer end of the screw shaft.

Describing a cycle of operation and starting with the parts in their normal or disengaged position illustrated in Figs. 1 and 2, when the motor is operated and the driving shaft thereby rotated, the screw shaft is likewise rotated with the result that the pinion 6 automatically moves longitudinally into engagement with the fly-wheel of the engine. When the pinion has meshed with the fly-wheel and come into contact with the usual stop nut 19 carried upon the inner end of the screw shaft, the pinion will partake of the rotary movement of the screw shaft and the fly-wheel will thereupon be rotated and the engine will be started. When the engine starts on its own power, the pinion will be demeshed in the uusal and well-known manner. In the event that the pinion teeth and the fly-wheel teeth should not register but should abut end to end when the pinion is thus advanced longitudinally, the pinion will be arrested thereby in its longitudinal movement but the screw shaft will continue rotating and will move longitudinally to the right against the tension of the light spring 18, thereby relieving the shock and pressure of such abutting. The pinion will thereupon be slightly moved angularly by the rotation of the screw shaft, whereupon the pinion teeth and fly-wheel teeth will register and mesh of these teeth will be accomplished with the assistance of the spring 18 which has been compressed in such longitudinal movement of the screw shaft.

I claim:

1. An engine starter drive including a driven member mounted for rotary and longitudinal movement, a member adapted to connect between a member of the engine to be started and said driven member and mounted on the latter for longitudinal movement thereof and rotary movement therewith, a driving shaft on which the driven member is mounted and a rotatable driving sleeve telescopingly connected with and keyed to the driven member for positive rotary movement together and for longitudinal movement of the driven member with respect to the sleeve, a driving head on said shaft journaled to said sleeve, and a drive spring encircling said sleeve and yieldably connecting said sleeve and driving head.

2. An engine starter drive including a driven member mounted for rotary and longitudinal movement, a member adapted to connect between a member of the engine to be started and said driven member and mounted on the latter for longitudinal movement thereof and rotary movement therewith, a rotatable driving sleeve telescopingly connected with and keyed to the driven member for positive rotary movement together and for longitudinal movement of the driven member with respect to the sleeve, and a spring contained within the sleeve and acting on the driven member to resist its longitudinal movement.

3. An engine starter drive including a driven member mounted for rotary and longitudinal movement, a member adapted to connect between a member of the engine to be started and said driven member and mounted on the latter for longitudinal movement thereof and rotary movement therewith, a rotatable driving sleeve telescopingly connected with and keyed to the driven member for positive rotary movement together and for longitudinal movement of the driven member with respect to the sleeve, means tending to resist such longitudinal movement of the driven member, a driving head, and a yielding driving connection between such head and sleeve.

4. An engine starter drive including a driven member mounted for rotary and longitudinal movement, a member adapted to connect between a member of the engine to be started and said driven member and mounted on the latter for longitudinal movement thereof and rotary movement therewith, a rotatable driving sleeve telescopingly connected with and keyed to the driven member for positive rotary movement together and for longitudinal movement of the driven member with respect to the sleeve, means tending to resist such longitudinal movement of the driven member, a driving head, and a drive spring connecting between such head and sleeve.

5. An engine starter drive including a driven member mounted for rotary and longitudinal movement, a member adapted to connect between a member of the engine to be started and said driven member and mounted on the latter for longitudinal movement thereof and rotary movement therewith, a rotatable driving sleeve telescopingly connected with and keyed to the driven member for positive rotary movement together and for longitudinal movement of the driven member with respect to the sleeve, a driving head, a yielding driving connection between such head and sleeve, and a spring interposed between the head and driven member and tending to resist the longitudinal movement of the latter.

6. An engine starter drive including a driven member mounted for rotary and longitudinal movement, a member adapted to connect between a member of the engine to be started and said driven member and mounted on the latter for longitudinal movement thereof and rotary movement therewith, a rotatable driving sleeve telescopingly connected with and keyed to the driven member for positive rotary movement together and for longitudinal movement of the driven member with respect to the sleeve, a driving head operatively connected with said sleeve, such sleeve having its ends bearing upon the head and driven member, respectively, and means contained within the sleeve tending to resist the longitudinal movement of the driven member.

7. An engine starter drive including a rotatable driving shaft, a driving head thereon, a hollow screw shaft mounted on the driving shaft for rotary movement therewith and longitudinal movement thereon, a driving member threaded on the screw shaft for rotary movement therewith and for longitudinal movement for engagement with a member of the engine to be started, a driving sleeve operatively connected with the head and mounted on one end of the screw shaft and operatively connected therewith for rotary movement together during all conditions of operation and for longitudinal movement of the screw shaft, and a yielding device forming such driving connection between the head and sleeve.

8. An engine starter drive including a rotatable driving shaft, a driving head thereon, a hollow screw shaft mounted on the driving shaft for rotary movement therewith and longitudinal movement thereon, a driving member threaded on the screw shaft for rotary movement therewith and for longitudinal movement for engagement with a member of the engine to be started, a driving sleeve operatively connected with the head and mounted on one end of the screw shaft and operatively connected therewith for rotary movement together during all conditions of operation and for longitudinal movement of the screw shaft, a yielding driving connection between the head and sleeve, and a yielding means tending to resist the longitudinal movement of the screw shaft.

9. An engine starter drive including a rotatable driving shaft, a driving head thereon, a hollow screw shaft mounted on the driving shaft for rotary movement therewith and longitudinal movement thereon, a driving member threaded on the screw shaft for rotary movement therewith and for longitudinal movement for engagement with a member of the engine to be started, a driving sleeve operatively connected with the head and mounted on one end of the screw shaft and operatively connected therewith for rotary movement together and for longitudinal movement of the screw shaft, a drive spring between the head and sleeve, and a spring interposed between the head and screw shaft tending to resist the longitudinal movement of the latter.

10. An engine starter drive including a rotatable driving shaft, a driving head thereon, a hollow screw shaft mounted on the driving shaft for rotary movement therewith and longitudinal movement thereon, a driving member threaded on the screw shaft for rotary movement therewith and for longitudinal movement for engagement with a member of the engine to be started, a driving sleeve operatively connected with the head and mounted on one end of the screw shaft and operatively connected therewith for rotary movement together and for longitudinal movement of the screw shaft, the screw shaft and sleeve being keyed to each other and the screw shaft telescoping into one end of the sleeve, and the sleeve bearing at its other end upon the head, and means tending to resist longitudinal movement of the screw shaft.

11. An engine starter drive including a rotatable driving shaft, a driving head thereon, a hollow screw shaft mounted on the driving shaft for rotary movement therewith and longitudinal movement thereon, a driving member threaded on the screw shaft for rotary movement therewith and for longitudinal movement for engagement with a member of the engine to be started, a driving sleeve operatively connected with the head and mounted on one end of the screw shaft and operatively connected therewith for rotary movement together and for longitudinal movement of the screw shaft, the screw shaft and sleeve being keyed to each other and the screw shaft telescoping into one end of the sleeve, said head having a reduced portion by which the other end of the sleeve is supported, and means tending to resist longitudinal movement of the screw shaft.

12. An engine starter drive including a rotatable driving shaft, a driving head thereon, a hollow screw shaft mounted on the driving shaft for rotary movement therewith and longitudinal movement thereon, a driving member threaded on the screw shaft for rotary movement therewith and for longitudinal movement for engagement with a member of the engine to be started, a driving sleeve operatively connected with the head and mounted on one end of the screw shaft and operatively connected therewith for rotary movement together and for longitudinal movement of the screw shaft, the screw shaft and sleeve being keyed to each other and the screw shaft telescoping into one end of the sleeve, said head having a reduced portion by which the other end of the sleeve is supported, and a spring contained within the sleeve and interposed between the screw shaft and the head.

13. An engine starter drive including a rotatable driving shaft, a driving head thereon, a hollow screw shaft mounted on the driving shaft for rotary movement therewith and longitudinal movement thereon, a driving member threaded on the screw shaft for rotary movement therewith and for longitudinal movement for engagement with a member of the engine to be started, a driving sleeve operatively connected with the head and mounted on one end of the screw shaft and operatively connected therewith for rotary movement together and for longitudinal movement of the screw shaft, a coiled spring encircling said sleeve and forming the driving connection between the head and sleeve.

14. An engine starter drive including a rotatable driving shaft, a driving head thereon, a hollow screw shaft mounted on the driving shaft for rotary movement therewith and longitudinal movement thereon, a driving member threaded on the screw shaft for rotary movement therewith and for longitudinal movement for engagement with a member of the engine to be started, a driving sleeve operatively connected with the head and mounted on one end of the screw shaft and operatively connected therewith for rotary movement together and for longitudinal movement of the screw shaft, the screw shaft having a longitudinal groove near one end adjacent such sleeve, and such sleeve having a pin engaging such groove for limiting the longitudinal movement of the screw shaft with respect to the sleeve.

VINCENT BENDIX.